United States Patent [19]

Meadus et al.

[11] 4,406,788
[45] Sep. 27, 1983

[54] PARTICULATE SOLIDS CONVEYING AND DRAINING DEVICE

[75] Inventors: Frederick W. Meadus; Bryan D. Sparks, both of Ottawa, Canada

[73] Assignee: Canadian Patents & Development Ltd., Ottawa, Canada

[21] Appl. No.: 417,488

[22] Filed: Sep. 10, 1982

[30] Foreign Application Priority Data

Feb. 25, 1982 [CA] Canada ................................. 397054

[51] Int. Cl.³ ........................ B01D 21/26; B01D 33/02
[52] U.S. Cl. ............................... 210/512.1; 210/512.3; 210/383; 196/14.52
[58] Field of Search .................. 210/512.1, 512.3, 784, 210/787, 511, 383, 201; 251/127; 137/262, 574, 576; 208/11 LE, 8, 11 R; 196/14.52

[56] References Cited

U.S. PATENT DOCUMENTS 2,364,799 12/1944 Laughlin ......................... 210/512.1
3,204,772 9/1965 Ruxton ........................... 210/512.1
3,249,116 5/1966 Hudson ............................... 137/262
3,984,287 10/1976 Meadus et al. ..................... 210/511
4,250,017 2/1981 Reale ................................... 210/511

Primary Examiner—Charles N. Hart
Assistant Examiner—Wanda L. Millard
Attorney, Agent, or Firm—Francis W. Lemon

[57] ABSTRACT

A particulate solids conveying and draining device, for mounting in a solids outlet wall, comprising a funnel-shaped rotor with particulate solids scooping members attached thereto. Each particulate solids scooping member comprises a paddle scooping portion leading to a liquid draining, particulate solids spilling, rib portion. In operation, the rotor is rotated so that the particulate solids scooping members scoop a slurry of the particulate solids and, on rotation, drain liquid therefrom through liquid return ports to the center of the funnel-shaped rotor and back to the slurry. When particulate material reaches its angle of repose on a particulate solids scooping member, it tumbles across and off the rotor on the other side of the outlet wall to that at which the slurry is situated.

5 Claims, 5 Drawing Figures

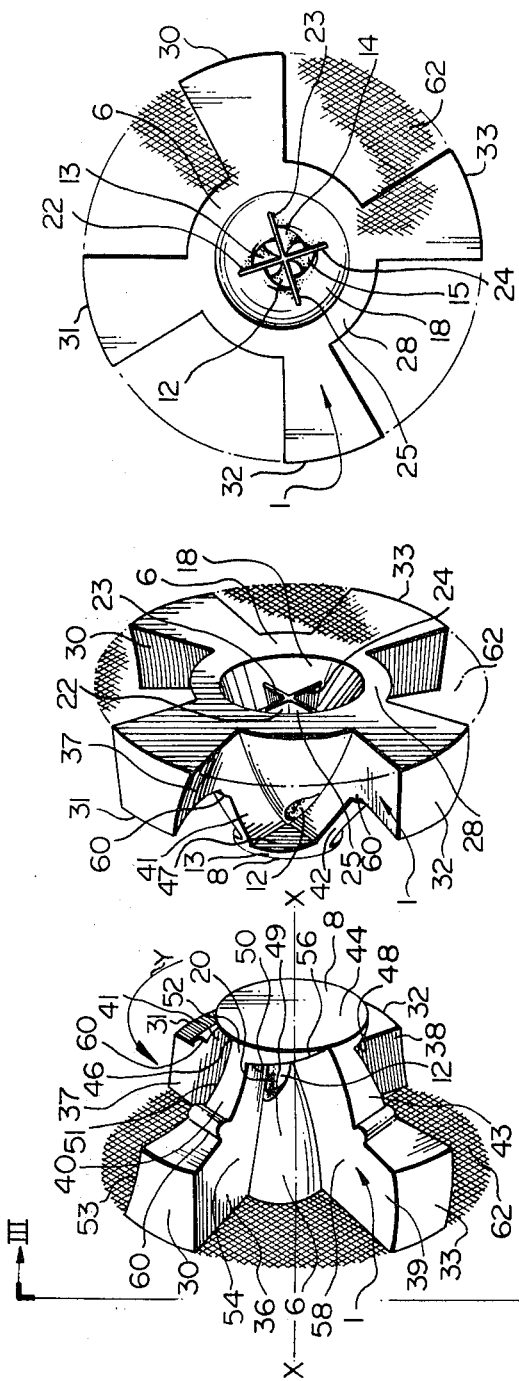

PARTICULATE SOLIDS CONVEYING AND DRAINING DEVICE

This invention relates to a particulate solids conveying and draining device.

It has already been proposed in U.S. Pat. No. 3,984,287, dated Oct. 5, 1976, "Apparatus for Separating Organic Material from Particulate Tar Sands and Coal and Agglomeration of the Particulate Residue", by F. W. Meadus, B. D. Sparks and I. E. Puddington, to solvent extract organic material from tar or oil sands or particulate coal in a coneshaped drum which is rotating about a horizontal axis to ball agglomerate the residue. The solvent flows along the drum to exit therefrom, rich in bitumen from the oil sands, through a central opening in the smaller end while the agglomerates are formed by tumbling the oil sands or the particulate coal towards the larger end of the drum so that the agglomerates exit through a central opening in an end wall at the larger end of the drum. Thus, the solvent flows counter-currently with respect to the oil sands and particulate coal.

It has been found to be difficult to accomplish the counter-current without resorting to external devices, such as, for example, settlers, cyclones, thickeners, centrifuges, and filters, which results in an additional material handling step and is less favourable economically.

There is a need for a device which will drain and move particulate solids through an outlet in a wall.

According to the present invention, there is provided a particulate solids conveying and draining device, for mounting in a solids outlet of a wall, comprising:

(a) a funnel-shaped rotor extending towards an outer end through the solids outlet and substantially symmetrical about an axis of generation of the funnel shape and tapering inwardly along that axis, in the direction for movement of solids through the outlet, towards the outer end, the rotor having liquid return ports leading to a hollow central portion thereof, the liquid return ports being circumferentially spaced around the outer end and being shaped with a substantially straight side on a trailing side for a direction of rotation of the funnel-shaped rotor, with each straight side extending along the axis of generation of the funnel shape, (b) liquid collecting means attached to the funnel-shaped rotor in the hollow central portion for returning liquid, passing into the hollow central portion, by the return ports, to an inner end of the funnel-shaped rotor, (c) for each liquid return port, a particulate solid scooping and spilling member attached to the funnel shaped rotor and extending therealong and outwardly therefrom, with each member comprising a paddle scooping portion adjacent the inner end of the funnel-shaped rotor and a drained liquid directing, particulate solids spilling rib portion adjacent the substantially straight side of the associated liquid return port, the paddle scooping portions being for mounting adjacent an inner side of the wall with the rib portions extending through the outlet therein, (d) an outer end wall closing the hollow, central portion of the funnel-shaped rotor and spaces between the rib portions, (e) whereby, in operation, when the device is mounted in the solids outlet of the wall and rotated so that the particulate solids scooping and spilling members dip into a particulate solids and liquid mixture, the rib portions and the outer end wall direct draining liquid picked up by the scooping portions into the liquid return ports, while the scooping portions direct particulate material, picked up thereby, across the funnel-shaped rotor from that scooping portion to spill off the outer edge of a rib portion of another, adjacent, particulate solid scooping and spilling member which is leading in the direction of rotation.

In the accompanying drawings which illustrate, by way of example, an embodiment of the present invention, FIG. 1 is a perspective view of a particulate solids conveying and draining device showing the outer scooped solids delivery end;

FIG. 2 is another perspective view of the device shown in FIG. 1, but from the other side showing the inner, drained liquid delivery end;

FIG. 3 is an end view in the direction III—III, FIG.1;

Figure 4:
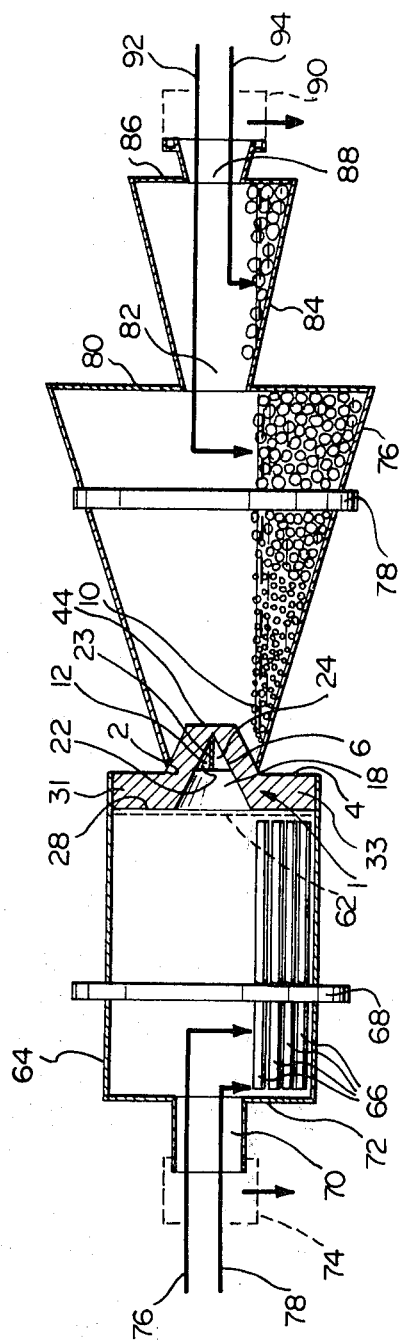
FIG. 4 is a diagrammatic view of an apparatus, for separating organic material from oil sands and agglomerating the particulate residue, incorporating the device shown in FIGS. 1 to 3.

In FIGS. 1 to 4 there is shown a particulate solids conveying and draining device 1, for mounting in a solids outlet 2 (FIG. 4) of a wall 4, comprising:

(a) a funnel-shaped rotor 6 extending towards an outer end 8 through the solids outlet 2 and substantially symmetrical about an axis of generation XX (FIG. 1) of the funnel shape and tapering inwardly along the axis XX, in the direction for movement of solids 10 (FIG. 4) through the outlet 2 towards the outer end 8, the rotor 6 having liquid return ports 12 to 15 (FIG. 3) leading to a hollow central portion 18 thereof, the liquid return ports 12 to 15 being circumferentially spaced around the outer end 8 and being shaped with a substantially straight side, such as side 20 of port 12, on a trailing side for a direction of rotation Y (FIG. 1) of the funnel-shaped rotor 6, with each straight side, such as 20, extending along the axis of generation XX of the funnel shape, (b) liquid collecting means, in the form of partitions 22 to 25, attached to the funnel-shaped rotor 6 in the hollow central portion 18 for returning liquid passing into the hollow central portion 18, by the return ports 12 to 15, to an inner end 28 of the funnel-shaped rotor 6, (c) for each liquid return port 12 to 15, a particulate solid scooping and spilling member, 30 to 33, attached to the funnel-shaped rotor 6 and extending therealong and outwardly therefrom, with each member, 30 to 33, comprising a paddle scooping portion, 36 to 39, respectively, adjacent the inner end 28 of the funnel-shaped rotor 6 and a drained liquid directing, particulate solids spilling rib portion, 40 to 43, respectively, adjacent the substantially straight side, such as side 20, of the associated liquid return port, 12 to 15, the paddle scooping portions, 36 to 39, being for mounting adjacent an inner side of the wall 4 with the rib portions, 40 to 43, extending through the outlet 2 therein, (d) an outer end wall 44 closing the hollow, central portion 18 of the funnel-shaped rotor 6 and spaces, 46 to 49, between the rib portions, 40 to 43, respectively, (e) whereby, in operation, when the device is mounted in the solids outlet 2 of the wall 4 and rotated, in the direction of arrow Y (FIG. 1), so that the particulate solids scooping and spilling members, 30 to 33, dip into a particulate solids and liquid mixture, the rib portions, 40 to 43, and the outer end wall 44 direct draining liquid picked up by the scooping portions, 36 to 39, into liquid return ports 12 to 15 while particulate material, picked up thereby, is directed across the funnel-shaped rotor 6 from that scooping portion, such as 37, to spill off the outer edge, such as edge 51, of a rib portion, such as 40, of another, adjacent particulate solids scooping and spilling member 30 which is leading in the direction of rotation Y.

Preferably each of the particulate solids scooping and spilling members, such as scooping member 30 (FIG. 1), is wedge-shaped to taper inwardly from the inner end 28 of the funnel-shaped rotor 6 and has a concave, particulate material conveying surface, such as 53, leading to the outer edge, such as 51.

The partitions, 22 to 25, preferably extend radially on each side of the liquid return ports 12 to 15 and are joined at an inner portion of the hollow central portion 18.

Preferably, for each space 46 to 49 between the rib portions 40 to 43, the outer end wall 44 has curved surfaces such as 50 (FIG. 1), for directing draining liquid from each particulate solids scooping and spilling member such as 30, to each liquid return port such as port 12, with each curved surface such as 50, leading from a relatively thicker portion such as 52, of the outer end wall 44, adjacent the side 54 of a particulate solids scooping and spilling member 30, from which liquid is to drain, to a relatively thinner portion 56 of the outer end wall 44 adjacent the side 58 of a next leading scooping and spilling member 33 for receiving particulate material from across the funnel-shaped rotor 6.

Preferably, for each particulate solids scooping and spilling member, 30 to 33, a sealing bead 60 is provided at the junction between the scooping portion, 36 to 39, and the rib portion, 40 to 43, the sealing beads 60 extending generally in the direction Y for rotation of the device 1 and being for sealing the particulate solids scooping and spilling members, 30 to 33, to the wall 4 and retarding liquid from spilling along the rib portions, 40 to 43, and through the outlet 2.

The device 1 is mounted in the outlet 2 (FIG. 4) of the wall 4 with a screen 62 adjacent the inner end 28. The wall 4 is an end wall of a rod mill 64 containing rods 66 and the size of the openings in the screen 62 is selected to allow access of only slurried particulate solids to the particulate solids scooping members, 30 to 33, from the rod mill 64 and to isolate the rods 66 from the device 1. The screen 62 may be a wire screening or a perforated metal cloth, such as cathedral cloth, and in this embodiment, is mounted for rotation with the device 1.

The rod mill 64 is rotated via a drive ring 68, by means not shown, and the device 1 is mounted in the wall 4 for rotation therewith.

The rod mill 64 has a feed inlet 70 in a wall 72 situated at an opposite end of the rod mill 64 to the wall 4. A rotary seal 74 is attached to the wall 72 for the retention of organic vapours in the rod mill 64. Means, 75 and 77, are provided for feeding water and oil sand, respectively, to the rod mill 64.

The wall 4 also forms an end at the small end of a truncated, agglomerating cone 76, which is mounted for rotation, by means not shown, about the same horizontal axis, and with the rod mill 64 via a drive ring 78. The agglomerating cone 76 has an end wall 80 having an agglomerate outlet 82.

A truncated, agglomerate wash cone 84 is connected to the end wall 80 for receiving agglomerates from the agglomerating cone 76 and for rotation therewith. The wash cone 84 has an end wall 86 containing an agglomerates outlet 88 leading to a rotary seal 90. Means, 92, is provided for feeding water to the agglomerating cone 76 and means, 94, is provided for feeding solvent, in this instance Varsol [trademark], to the wash cone 84.

In operation, the apparatus shown in FIGS. 1 to 4 is rotated so that the particulate solids conveying and draining device 1 is rotated in the direction of arrow Y (FIG. 1) while water, preferably adjusted to a pH of about 9.5 by, for example, NaOH, is delivered by means 75 and 92 to the rod mill 64 and the agglomerating cone 76, respectively. Oil sand is fed to the rod mill 64, by means 77, and solvent is fed to the wash cone 84.

The quantity of water added by the means 76 is enough to initiate nucleation of the solid components of the oil sands, while the total quantity of water fed by the means 75 and 92, together with the water already present in the oil sands, is sufficient to form relatively large agglomerates.

The solvent fed by means 94 is sufficient to maintain a solids, liquids mixture (slurry) and yield a suitable equilibrium bitumen concentration in the rich extract which exits from the rod mill 64 at the feed inlet 70.

Lumps of oil sand fed to the rod mill are broken down by the rods 66 so that the oil sand forms a slurry with the solvent flowing into the rod mill 64 from the agglomerating cone 76.

The slurry is scooped up by the scooping and spilling members, 30 to 33, and tar enriched solvent drains from the scooping and spilling members, 30 to 33, as they emerge from the slurry, through the screen 62 and through the substantially D-shaped ports, 12 to 15, back into the rod mill 64. Slurried particulate material, which has been scooped up from the rod mill 64 by the scooping and spilling members, 30 to 33, is lifted by them until the angle of repose is exceeded, whereupon the particulate material falls across the funnel-shaped rotor 6 from one scooping and spilling member, such as 31, to spill off the outer edge, such as 51, of a rib spilling portion, such as 40, of another scooping and spilling member 30 into the agglomerating cone 76, as previously described.

The particulate material, fed by the particulate solids conveying and draining device 1 to the agglomerating cone 76, is agglomerated therein into spherical agglomerates which spill therefrom into the wash cone 84 and exit from the wash cone 84 through the agglomerates outlet 88.

The solvent, fed by means 94, washes the exterior of the agglomerates substantially free of bituminous material in the wash cone 84. The solvent containing bituminous material passes from the wash cone 84 through the outlet 82 into the agglomerating cone where it removes further bituminous material from the particulate material as it is being agglomerated. The solvent in the agglomerating cone is fairly lean, i.e. contains preferably less than 20 wt. % bitumen, and so easily overflows through the particulate solids scooping and draining device 1 into the rod mill 64. The lean solvent flows along the rod mill 64 dissolving further organic material to form a bitumen rich extract which exits from the rod mill 64 through the feed inlet 70.

The following table shows test results using the apparatus shown in FIGS. 1 to 4 to separate bitumen from oil sands. In these tests, the solids content of the total feed to the rod mill 64 was 50 wt. %.

Figure 5:
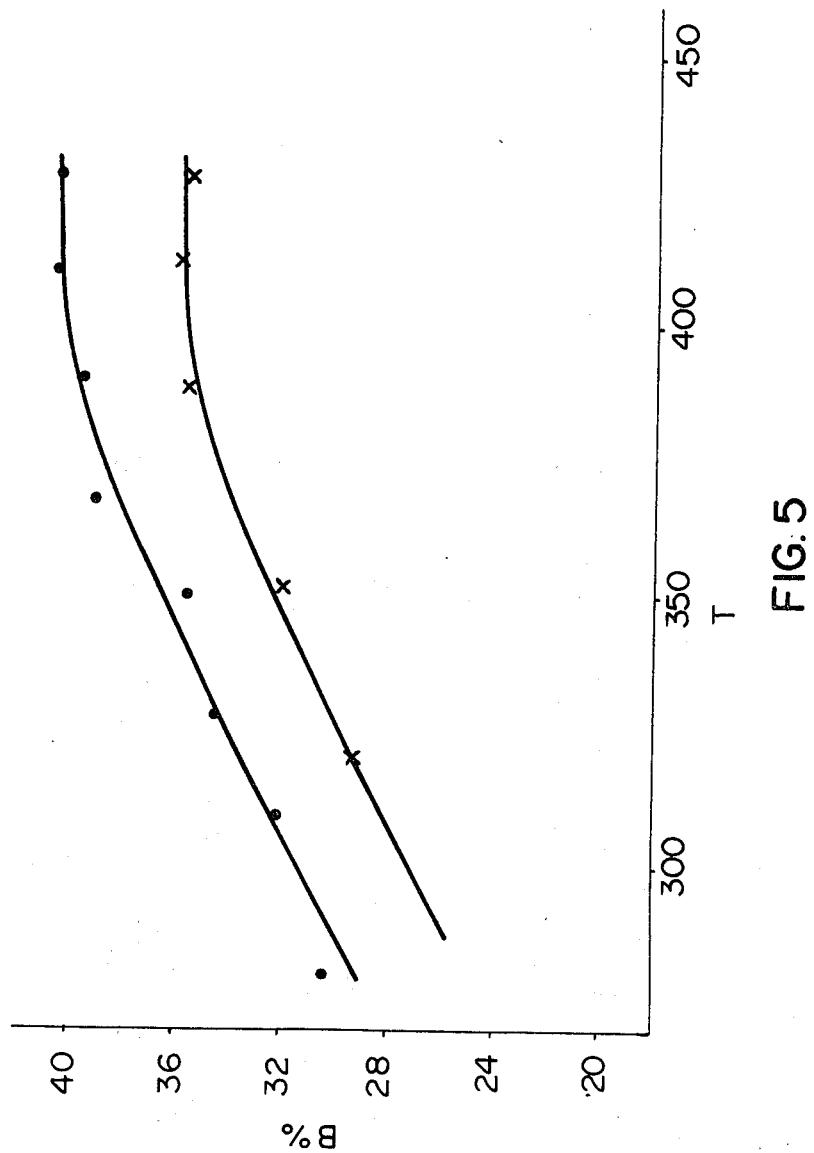
FIG. 5 is a graph showing the concentration of bitumen on each side of the particulate solids scooping and draining device shown in FIGS. 1 to 4, plotted against time of operation.

Referring now to FIG. 5, there is shown a graph of test results, using the apparatus shown in FIGS. 1 to 4, to determine the bitumen present in the agglomerating cone 76 and the rod mill 64.

In the graph, the weight % bitumen (B%) is plotted against the operating time T in minutes. In the graph, x represents the bitumen concentration in the agglomerating cone 76, and ● represents the bitumen concentration in the rod mill 64.

The lower bitumen content in the rod mill 64 compared to that in the agglomerating cone 76 is an indication of the effectiveness of the solid/liquid separation achieved by the apparatus.

Preferably, the outer surface of the particulate solids conveying and draining device 1 is hydrophobic and, to this end, devices 1 of polytetrafluoroethylene and high density polyethylene, which are also substantially inert to the solvent, have been tested and found to be satisfactory, possessing good abrasion resistance. If desired, a metal device 1 may be used having a coating of a hydrophobic material, such as, for example, polyurethane rubber or polytetrafluoroethylene.

Tests have also shown that the more obtuse the included angle is of the funnel-shaped rotor 6, the better the particulate solids conveying and draining device separates particulate solids from a liquid.

It will be appreciated that the larger the particulate solids conveying and draining device 1, the larger the number of particulate solid scooping members that may be used.

A number of particulate solids conveying and draining devices 1 may be provided in series connecting a number of rod mill compartments in series to provide a greater concentration differential if desired.

Instead of a rod mill 64 other types of mills may be used, such as, for example, a ball mill.

TABLE

| | | | RPM of particulate solids scooping device | | |
|---|---|---|---|---|---|
| | | | 10 | 15 | 20 |
| Total Feed Rate of Oil Sands (Kg/hr) | 10 | Solids in mill (wt. %) | 57.9 | 45.7 | 28.2 |
| | | Residence time in mill of solids (min.) | 10.1 | 7.8 | 4.3 |
| | | Solids in overflow (wt. %) | 74.0 | 72.4 | 74.9 |
| | 25 | Solids in mill (wt. %) | 51.8 | 51.9 | 52.7 |
| | | Residence time in mill of solids (min.) | 4.4 | 3.9 | 3.7 |
| | | Solids in overflow (wt. %) | 73.7 | 75.2 | 50.3 |
| | 40 | Solids in mill (wt. %) | 61.8 | 52.9 | 58.3 |
| | | Residence time in mill of solids (min.) | 4.1 | 2.9 | 2.4 |
| | | Solids in overflow (wt. %) | 74.0 | 69.0 | 59.0 |

I claim:

1. A particulate solids conveying and draining device, for mounting in a solids outlet of a wall, comprising:
   (a) a funnel-shaped rotor extending towards an outer end through the solids outlet and substantially symmetrical about an axis of generation of the funnel shape and tapering inwardly along that axis, in the direction for movement of solids through the outlet, towards the outer end, the rotor having liquid return ports leading to a hollow central portion thereof, the liquid return ports being circumferentially spaced around the outer end and being shaped with a substantially straight side on a trailing side for a direction of rotation of the funnel-shaped rotor, with each straight side extending along the axis of generation of the funnel shape;
   (b) liquid collecting means attached to the funnel-shaped rotor in the hollow central portion for returning liquid, passing into the hollow central portion, by the return ports, to an inner end of the funnel-shaped rotor;
   (c) for each liquid return port, a particulate solid scooping and spilling member attached to the funnel-shaped rotor and extending therealong and outwardly therefrom, with each member comprising a paddle scooping portion adjacent the inner end of the funnel-shaped rotor and a draining, particulate solids spilling rib portion adjacent the substantially straight side of the associated liquid return port, the paddle scooping portions being for mounting adjacent an inner side of the wall with the rib portions extending through the outlet therein;
   (d) an outer end wall closing the hollow, central portion of the funnel-shaped rotor and spaces between the rib portions;
   (e) whereby, in operation, when the device is mounted in the solids outlet of the wall and rotated so that the particulate solids scooping and spilling members dip into a particulate solids and liquid mixture, the rib portions and the outer end wall direct draining liquid picked up by the scooping portions into the liquid return ports, while the scooping portions direct particulate material, picked up thereby, across the funnel-shaped rotor from that scooping portion to spill off the outer edge of a rib portion of another, adjacent, particulate solid scooping and spilling member which is leading in the direction of rotation.

2. A device according to claim 1 wherein each of the particulate solid scooping members is wedge-shaped to taper inwardly from the inner end of the funnel-shaped rotor and a concave particulate material conveying surface leading to the said outer edge.

3. A device according to claim 1 wherein the liquid collecting means comprises, for each liquid inlet port, radially extending partitions on each side thereof and joined at an inner portion of the hollow central portion.

4. A device according to claim 1, wherein for each space between the rib portions, the outer end wall has curved surfaces for directing draining liquid from the particulate solids scooping and spilling member to each liquid return port, with each curved surface leading from a relatively thicker portion of the outer end wall adjacent the side of a particulate solids scooping and spilling member, from which liquid is to drain, to a relatively thinner portion of the outer end wall adjacent the side of a next, leading, particulate solids scooping and spilling member for receiving particulate material from across the funnel-shaped rotor.

5. A device according to claim 1, which includes, for each particulate solids scooping and spilling member, a sealing bead at the junction between the scooping portion and the rib portion, the sealing beads extending generally in the direction for rotation of the device and being for sealing the particulate solids scooping and spilling members to the wall.

* * * * *